Aug. 21, 1934.        A. W. BARBER           1,971,310
                     MEASURING REACTANCE
              Filed May 25, 1933      3 Sheets-Sheet 1

Alfred W. Barber
INVENTOR

BY
ATTORNEY

Aug. 21, 1934.                A. W. BARBER                 1,971,310
                           MEASURING REACTANCE
                      Filed May 25, 1933        3 Sheets-Sheet 2

Alfred W. Barber
INVENTOR

ATTORNEY

Aug. 21, 1934.  A. W. BARBER  1,971,310
MEASURING REACTANCE
Filed May 25, 1933   3 Sheets-Sheet 3

Alfred W. Barber
INVENTOR
ATTORNEY

Patented Aug. 21, 1934

1,971,310

UNITED STATES PATENT OFFICE 1,971,310

MEASURING REACTANCE

Alfred W. Barber, New York, N. Y., assignor to Premier Crystal Laboratories, Inc., New York, N. Y., a corporation of New York Application May 25, 1933, Serial No. 672,813

15 Claims. (Cl. 175—183)

This invention is broadly directed to a meter for the measurement of capacity or inductance which can cover a great range of values and is characterized by ease of operation, simplicity of parts and adjustment and comparatively great accuracy.

This invention utilizes a system of inductance coils which are capable of being tuned to a given frequency by condensers extending over a very wide range of capacity values.

This invention utilizes a resonant system which has its anti-resonant frequency changed by connecting thereto the capacity or inductance which is to be measured and then is brought back to the original frequency by the variation of a known capacity.

The art of measuring capacities and inductances previously has employed two general systems of measurement. One of these is the substitution method, in which the condenser or inductance whose value is to be determined is directly added to an already known condenser or inductance and the latter varied to restore the total value of the combination to that which it had before the addition of the unknown capacity or inductance, and is adapted only to the measurement of such values of capacity or inductance as may readily be equalled by variation of the standard to which they are added.

A serious limitation is thus placed upon the measurement of these electrical values, since a standard such as a variable condenser is only capable of precision calibration over a comparatively low ratio of values, e. g. 10 to 1 is a common ratio range.

Another method of measuring these electrical values is by the employment of some modification of the Wheatstone bridge circuit. This method is likewise limited to a comparatively low range of measurement, by reason of the low range of values available in a standard. While this method may be extended to greater ratios than the substitution method, yet it demands such complicated and delicate apparatus as well as such a high degree of technical skill in its successful and accurate employment that it has been employed chiefly for laboratory work in the hands of skilled technicians.

My invention aims to provide a means for so extending the range of measurement available by the substitution method, that it may be employed to measure unknown values of capacity and inductance over an extremely wide range of values, e. g. 100,000,000 to 1.

One object of my invention is to secure an extremely wide range of measurements with an instrument whose standard of comparison covers no greater range of values than is found in an ordinary commercial type of such standard.

Another object of my invention is to allow inductances having a wide range of values to be measured by means of a standard capacity having an ordinary range of values.

A still further object of my invention is to take advantage of the phenomenon of reflection of electrical values from one circuit of a transformer to another circuit thereof, so as to permit a virtual electrical multiplication or division of these values.

Another object of this invention is to provide a capacity or inductance meter having a wide measuring range with the employment of a single standard capacity of limited range. A still further object of my invention is to provide a compact, rugged, easily portable and comparatively accurate capacity or inductance meter which is rapid and simple to operate and yet will give comparatively accurate results.

Yet another object of this invention is to include in a capacity meter apparatus for determining its indication by means of the heterodyne beat method.

One other object of this invention is to provide in a meter such as described means for rapidly and easily determining the zero beat point of heterodyne oscillatory circuits.

A further object of this invention is to provide a meter such as just described having means for readily discriminating between the fundamental frequency of oscillating circuits and harmonic frequencies which may be present therein.

My invention may best be understood by reference to the accompanying drawings and specification.

Figure 1:
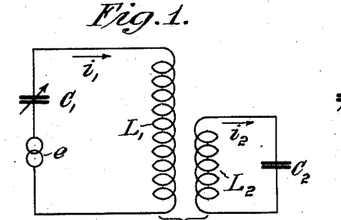
Fig. 1 is a schematic diagram illustrating certain mathematical principles of coupled circuits as employed in my invention.

Referring now to Fig. 1, two electro-magnetically employed circuits are there indicated and the component parts are designated by the usual conventional abbreviations denoting the electrical values thereof.

Circuit $C_1 L_1$ is coupled to circuit $C_2 L_2$ by the mutual inductance indicated at $M$. Currents $i_1$ and $i_2$ are circulating in the respective circuits and an electromotive force $e$ is present in the first circuit. Considering the steady state equations of these circuits we have $$e = -\frac{ji_1}{C_1\omega} + ji_1 L_1 \omega \pm ji_2 M\omega \quad (1)$$

$$0 = ji_2 L_2 \omega \pm ji_1 M\omega - \frac{ji_2}{C_2\omega} \quad (2)$$

Obtaining the value of $i_2$ from Equation (2) we derive:—

$$i_2 = \frac{\mp i_1 M\omega}{L_2\omega - \frac{1}{C_2\omega}} \quad (3)$$

Substituting the value of $i_2$ thus found in Equation (1) there is obtained the following:—

$$e = -\frac{ji_1}{C_1\omega} + ji_1 L_1 \omega \pm jM\omega\left(\frac{\mp i_1 M\omega}{L_2\omega - \frac{1}{C_2\omega}}\right) \quad (4)$$

$$\frac{e}{i} = \frac{-j}{C_1\omega} + jL_1\omega \pm jM\omega\left(\frac{\mp M\omega}{L_2\omega - \frac{1}{C_2\omega}}\right) = Z$$

At the point of resonance $Z$ becomes zero and hence:—

$$-\frac{1}{C_1\omega} + L_1\omega - \frac{M^2\omega^2}{L_2\omega - \frac{1}{C_2\omega}} = 0 \quad (5)$$

The simplification of Equation (5) yields:—

$$-\frac{L_2}{C_1} + \frac{1}{C_1 C_2 \omega^2} + L_1 L_2 \omega^2 - \frac{L_1}{C_2} - M^2 \omega^2 = 0 \quad (6)$$

If it is now assumed that $M$ has a value equivalent to 100% coupling between coils $L_1$ and $L_2$ the value of $M$ may be expressed $$M = \sqrt{L_1 L_2}$$

and the third and fifth terms of Equation (6) will cancel out and yield the following equation:—

$$-\frac{L_2}{C_1} + \frac{1}{C_1 C_2 \omega^2} - \frac{L_1}{C_2} = 0 \quad (7)$$

If this equation be changed by multiplication by $-C_1 C_2 \omega^2$ we obtain:—

$$L_2 C_2 \omega^2 - 1 + L_1 C_1 \omega^2 = 0$$

from which is derived:—

$$\omega = \frac{1}{\sqrt{L_1 C_1 + L_2 C_2}} \quad (8)$$

Figure 2:
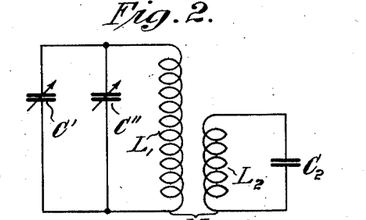
Fig. 2 is a further schematic diagram illustrating a simple circuit utilizing the principles of Fig. 1.

Referring now in addition to Fig. 2 we may suppose that $C_2$ represents the unknown capacity to be measured and that $C_1$ of Fig. 1 is actually made up of two condensers, $C'$ and $C''$ connected in parallel. We may assume that $C''$ represents a standard calibrated condenser which may be varied and have known values at different settings thereof.

Considering the equation applying to Fig. 2, it can be seen that Equation (8) will now take on this form:

$$\omega = \frac{1}{\sqrt{L_1 C' + L_1 C'' + L_2 C_2}} \quad (9)$$

by the substitution in the former equation of the value $C_1 = C' + C''$.

Let us now suppose that the unknown capacity $C_2$ is electrically disconnected from the system, as by opening one or more of its connecting wires. Let $C''$ be set at any suitable value, such as its maximum value, $C''$ max. Then Equation (9) will take the following form:—

$$\omega = \frac{1}{\sqrt{L_1 C' + L_1 C'' \text{ max}}} \quad (10)$$

If either of the two condensers now in the system be changed to a different value, for example if $C'$ be altered so that its value is $C'''$ then a new frequency $$\left(f_1 = \frac{\omega_1}{2\pi}\right)$$

will be produced and we may write:—

$$\omega_1 = \frac{1}{\sqrt{L_1 C''' + L_1 C'' \text{ max}}} \quad (11)$$

If the unknown condenser $C_2$ be now connected into the system as indicated in Fig. 2 an alteration of the system frequency will be brought about. If the original frequency of the system be restored by changing $C''$ max to a new value $C''''$, it will be seen that the sum of $L_1 C''''$ and $L_2 C_2$ must equal $L_1 C''$ max by Equation (9), since the system frequency is unchanged. This allows us to state the relationship of these quantities as follows:—

$$L_1 C'' \text{ max} = L_1 C'''' + L_2 C_2 \quad (12)$$

Solving this last equation for the value of $C_2$ we get $$C_2 = \frac{L_1 C'' \text{ max} - L_1 C''''}{L_2} = \frac{L_1}{L_2}(C'' \text{ max} - C'''') \quad (13)$$

From the foregoing mathematical proof it can be seen that $C_2$ is equal to the ratio of the inductances multiplied by the change in the standard capacity which was found necessary to restore the system to its original frequency after the addition of the unknown capacity $C_2$.

It is also to be noted that the solution of Equation (11) will yield results identical with those found by solving Equation (10). This latter fact indicates that the relationship between the unknown capacity and the change of capacity of $C''$ is independent of the frequency to which the system is tuned.

If we now consider $L_1$ and $L_2$ as actual physical structures composed of convolutions of wire, Equation (13) may evidently, from the well known relationship between the turns of such windings and the inductances thereof, be written as follows:

$$C_2 = \frac{(\text{turns of } L_1)^2}{(\text{turns of } L_2)^2}(C'' \text{ max} - C'''') \quad (14)$$

Accordingly under the ideal conditions presupposed with respect to Fig. 2, such as 100% coupling between the two coils, we find that if an unknown condenser be connected to one coil the change in the capacity across the other coil needed to restore the system frequency to the value which it had before the unknown condenser was connected, bears a fixed relation to the value of the unknown capacity.

If the coupling is not 100%

$$(M = \sqrt{L_1 L_2})$$

but is $$M = K\sqrt{L_1 L_2},$$

where K is less than unity, then Equation (14) becomes $$C_2 = \frac{L_1}{L_2}(C'' \text{ max} - C'''') \frac{C'' \text{ max}}{C'' \text{ max} - C''''(1-K^2)}$$

which may be considered similar to Equation (13) except for the additional factor $$\frac{C'' \text{ max}}{C'' \text{ max} - C''''(1-K^2)}$$

This last mentioned factor may then conveniently be termed a correction factor, in that it allows the effective action of the various elements to be computed at differing frequencies at which the system may operate.

Figure 3:
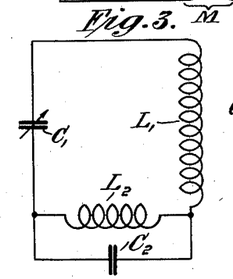
Fig. 3 illustrates schematically an alternative circuit which may be used in my invention.

Referring now to Fig. 3, there is here shown a circuit differing from that of Fig. 1 in that the coupling between the two inductances $L_1$ and $L_2$ is made zero. This form of circuit will give rise to equations differing somewhat from those just stated in connection with Figs. 1 and 2. Moreover, in the case of this figure the circuit $L_2C_2$ can have its values so chosen with respect to the frequency, that it can function either as a capacitative or as an inductive reactance.

By taking advantage of this property, it may be made possible for standard condenser $C_1$ to be varied in either direction desired, when condenser $C_2$ is being measured. However, I have found the circuit of Fig. 3 not as suitable for most uses of a commercial instrument as that of Fig. 1 and therefore illustrate it merely as an alternative circuit which can be employed in my invention.

Figure 4:
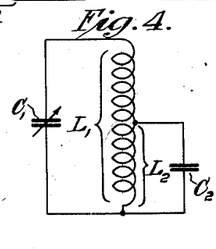
Fig. 4 shows another electrical circuit, involving one form of my invention.

In Fig. 4 there is illustrated a circuit which electrically lies between the circuits of Fig. 2 and Fig. 3, in that the coupling is partly mutual inductance and partly common self inductance. It can be seen that $L_1$ comprises the entire inductance while $L_2$ comprises only a portion of the same. This method of coupling is commonly referred to as an auto-transformer and presents many advantages in respect to ease of construction, and occupation of a smaller volume than in the case of transformers having two discrete windings.

Figure 5:
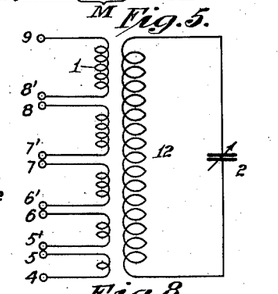
Figs. 5 and 6 illustrate further developments of the circuit of Fig. 2.

Fig. 5 shows a development of Fig. 2 where a plurality of small inductances such as 1 are provided, all coupled to a common inductance 12. At 2 is shown the standard condenser connected to inductance 12. Inductance 1 is provided with terminals 8' and 9 to which the unknown capacity may be connected. Other inductances similar to 1 but having a fewer number of turns are likewise shown, each inductance being provided with taps leading to its terminals. These terminals, numbered consecutively from 4 to 8, are also situated so that an unknown condenser may be connected to any pair of them.

It can accordingly be seen that the ratio factor by which the variation of the standard capacity 2 must be multiplied in order to give the value of the unknown capacity, may be varied by choosing the appropriate set of taps for connection to the unknown capacity.

Figure 6:
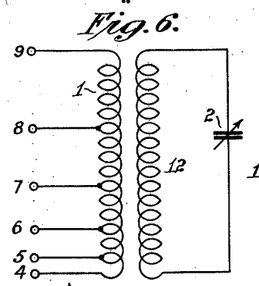

Fig. 6 illustrates a further development of the circuit of Fig. 5 where adjacent taps or terminals are joined together so that there is continuity from tap 4 to tap 9 and inductance coil 1 may therefore have either a portion thereof or the sum of two or more portions used in connection with the unknown capacity, by choosing suitable taps for connection to this capacity. This form of coil construction leads to mathematical results equivalent to Equation (13) and also may be corrected for less than unity coupling. It furnishes a very convenient method of rapidly shifting connections to an unknown capacity, until such an inductance ratio is found as will enable this capacity to be reflected through the transformer and as reflected, to fall within the range of standard condenser 2. In the case of Figs. 5 and 6, as well as most of the subsequent figures, the use of tapped coils is indicated and constitutes one element contributing to the wide range of values of measurement possible with my invention.

Figure 7:
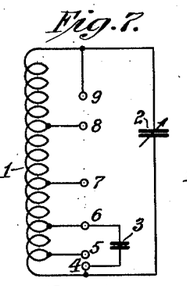
Fig. 7 illustrates one practical embodiment of the circuit of Fig. 4.

Fig. 7 shows the circuit of Fig. 4 arranged with a coil 1 similar to coil 1 of Fig. 6 and provided with similar taps.

Standard condenser 2 is connected from tap 4 to tap 9, i. e. across the entire winding, while the unknown capacity 3 is connected from tap 6 to tap 4, but may of course be connected across in other suitable taps, as has been explained in connection with Fig. 6, according to the relative values of capacities 2 and 3.

In Fig. 7 an inductance 1, is tuned by a known variable condenser 2 and an unknown fixed condenser 3. Inductance 1 has taps with leads brought out at points 4, 5, 6, 7, 8 and 9. If the anti-resonant frequency of inductance 1 and condenser 2, with condenser 2 at maximum value and condenser 3 disconnected, is $f$, and condenser 3 is connected as shown in Fig. 1 across taps 4 and 6 of coil 1, the anti-resonant frequency of the system will be lowered. To bring the anti-resonant frequency back to $f$, it is then necessary to decrease the value of condenser 2 by an amount bearing a definite relation to the capacity of condenser 3, which relation may be determined by experiment and may be computed by Equations 13 or 14.

It is to be understood that any suitable frequency in either the radio or the audio band may be used with any of these circuits.

The following description of actual apparatus embodying the circuit of Fig. 7 is illustrative of one mode of construction for obtaining a wide measuring range with my invention, although I am not, of course, limited to the particular values herein described.

A coil and condenser system as shown in Fig. 7 has been built in which tap 4 was at the start of the coil, tap 5 was at the 10th turn, tap 6 at the 32nd turn, tap 7 at the 100th turn, tap 8 at the 317th turn, and tap 9 at the end of the coil, which was the 1000th turn. The coil was provided with an air core and wound in such a manner that the coupling between various parts of the coil was high. The above described coil was found to require ten times the capacity value across taps 4 and 8 as across taps 4 and 9 for the same effect on the anti-resonant frequency of the combination. It was also found that the above described coil required 100 times the capacity value across taps 4 and 7, 1000 times across taps 4 and 6 and 10,000 times across taps 4 and 5, as across taps 4 and 9 for the same effect on the anti-resonant frequency.

Figure 8:
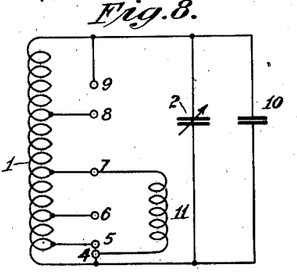
Fig. 8 shows the circuit of Fig. 7 as adapted to measure inductances.

Fig. 8 shows how the circuit of Fig. 7 may be modified in order to allow the measurement of inductances instead of capacities. It shows an inductance 1 tuned by condenser 2 and condenser 10 in parallel across taps 4 and 9, and inductance 11 across taps 4 and 7. Condenser 10 has a value near the maximum value of condenser 2 and condenser 2 is reduced to such a value that condensers 2 and 10 in parallel tune coil 1 to anti-resonant frequency $f$ with coil 11 disconnected. When coil 11 is connected across taps 4 and 7, the anti-resonant frequency $f$ is raised and condenser 2 is increased in value to regain frequency $f$.

This increase in the capacity of condenser 2, to maintain resonance, required by the connection of coil 11 to taps 4 and 7, bears a definite relation to the inductance value of coil 11, which relation may be determined by experiment. If coil 11 were connected across any other pair of taps on coil 1, another, but also definite, relation would exist between the inductance of coil 11 and the value of condenser 2 to be added to maintain anti-resonant frequency $f$ of the system, so that as in the case of capacity measurements, inductances may be measured over a wide range of values, by choosing appropriate ratios of transformation, the latter being varied by changing the connections to suitable taps.

Figure 9:
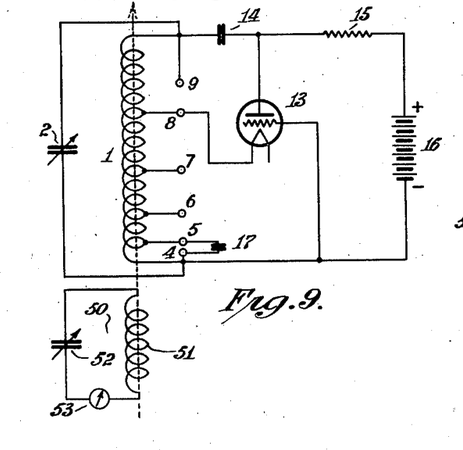
Fig. 9 shows the circuit of Fig. 7 connected to an electron tube so as to give rise to electrical oscillations.

In Fig. 9 is shown schematically an actual simple capacity meter using the circuit of Fig. 7 so connected to an electron tube and a source of energy, that it will be maintained in oscillation at approximately its natural period.

This figure shows an oscillator made up of coil 1, condenser 2, thermionic vacuum tube 13, blocking condenser 14, isolating resistor 15 and plate battery 16. The frequency of oscillation will be very nearly $f$, the anti-resonant frequency of coil 1 and condenser 2 in parallel. If condenser 17 is connected, for example, across taps 4 and 5 of coil 1, the frequency of oscillation of the system will be lowered. In order to restore the frequency of oscillation to $f$, condenser 2 must be reduced in capacity and the value of condenser 17 may be thus found, if the relation between condenser 2 and capacities across taps 4 and 5 has been determined by previous experiment.

It is to be understood that suitable means are provided for heating the cathode of tube 13 and that a suitable choke coil may be used in place of, or in addition to, the resistance 15.

As a means of determining the frequency of oscillation an external wave meter has been indicated at 50, comprising an inductance 51 and a capacity 52, as well as current indicating means 53 such as an ammeter suitable for the frequencies involved. This wave meter may be suitably coupled to the capacity meter proper and its method of operation to determine the frequency existing in the oscillatory circuits of the meter proper is well known in the art and therefore is not herein described.

Figure 9A:
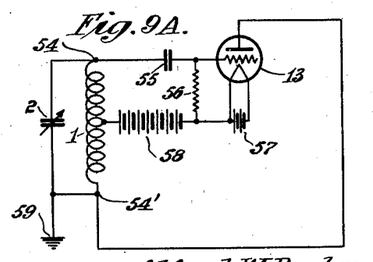
Fig. 9A shows a variation of the circuit of Fig. 9, using series power feed.

In Fig. 9A there is shown a variation of the oscillating circuits of Fig. 9. In this case a series feed circuit is employed. Coil 1 and capacity 2 forms the resonant circuit, one of whose terminals 54 is connected through a suitable stopping condenser 55 to the grid of tube 13. The grid is maintained at a suitable potential by means of leak resistor 56 connecting it to the filament of tube 13. The anode of tube 13 is connected to the other extremity 54' of the oscillatory circuit. A suitable source of electrical energy for heating the cathode of tube 13 is indicated at 57 and another source suitable for supplying the anode energy requirements of this tube is indicated at 58. It is understood that various sources of energy may be employed, other than the batteries indicated in the schematic diagram. The taps of coil 1 are omitted in this figure merely for the sake of clarity of illustration, but are understood to be present in the complete meter.

I have indicated one terminal of the oscillatory circuit as grounded at 59. While this is often desirable in order to avoid body capacity effects while adjusting condenser 2 yet if other means well known in the art are employed to minimize this body capacity effect, it may often be found desirable to ground the oscillatory circuit at some other point such as the filament of tube 13.

While Figs. 9 and 9A both show the "Hartley" type of oscillator circuit it will be apparent and has been found by experiment that other types of circuits may be employed, such as the dynatron circuit and I am not limited to any particular type of oscillator circuit.

Figures 10, 14:
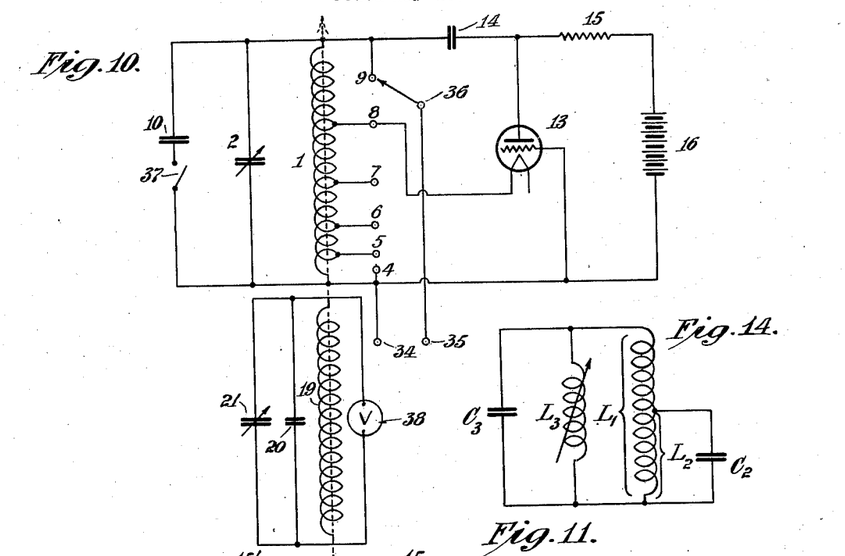
Fig. 10 shows schematically a meter embodying the circuit of Fig. 9.
Fig. 14 is a schematic circuit showing the use of a variable inductor in one form of my invention.

Fig. 10 shows a further development of the apparatus of Fig. 9, utilizing the circuit of Fig. 8 arranged to measure either inductance or capacity. Switch 37 is employed to connect condenser 10 in parallel with standard condenser 2 for the purpose described in connection with Fig. 8. Suitable binding posts 34 and 35 are provided for the connection of the unknown capacity or inductance. Binding post 34 is connected directly to tap 4 of coil 1 and binding post 35 may have its point of connection varied by means of switch 36 to any other suitable tap so that the ratio of transformation can be varied, as described in connection with Fig. 7.

Coil 19, tuned with condensers 20 and 21, is used to indicate when tube 13 is oscillating at frequency $f$, by means of voltage indicator 38.

Indicator 38 may be a high resistance voltmeter, a neon lamp or other high impedance device capable of showing when the voltage across coil 19 is at a maximum value. Series current indicators may alternatively be used with coil 19 as shown in Fig. 9, or a meter indicating the plate current of tube 13, by reaction may serve to indicate when tube 13 is oscillating at the frequency $f$ of coil 19, tuned with condensers 20 and 21. The methods for operating the device of Fig. 10 may be substantially identical with those described in connection with Figs. 8 and 9, the indicating circuit functioning, as in the case of Fig. 9, to allow the frequency $f$ to be restored to its original value in the circuits of the meter proper.

Many variations of the circuits illustrated in Fig. 10 will be apparent to those skilled in the art. For example, the electron tube oscillating circuits of the meter proper may be transferred to the circuits of the frequency indicating portion of the device.

Figure 11:
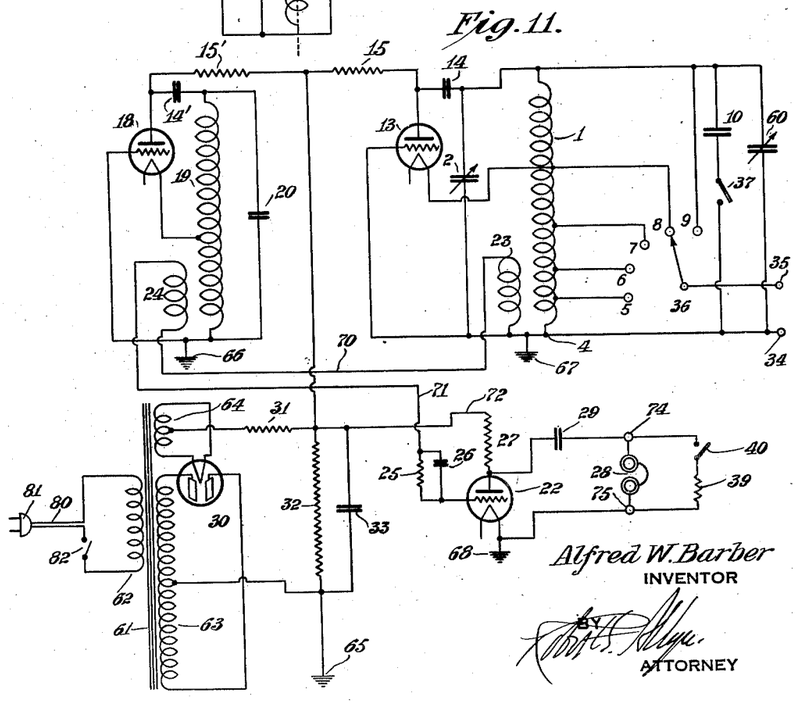
Fig. 11 shows schematically the essential details of a complete meter including the circuit of Fig. 9 as well as ancillary apparatus and circuits aranged to constitute a zero beat meter.

Fig. 11 illustrates a complete self-contained measuring instrument including the meter proper, which employs substantially the same circuit as illustrated in Fig. 10, as well as a generator of oscillations for purposes of comparison, electrical circuits for coupling the generator and the meter together, and apparatus for comparing the frequency of the generator and the meter, as well as detecting, amplifying, and power supply apparatus connected to certain of these various parts.

The meter proper is similar to that shown in Fig. 10 and the parts thereof bear similar reference numerals. In addition, however, there is provided a variable condenser 60 shunted across the standard condenser 2. Condenser 60 is conveniently of a small or so called vernier type and serves to allow the frequency of the meter circuits to be readily adjusted so that it will equal that of the generator, when condenser 2 is set at one extremity of its scale. This facilitates the reading of condenser 2, by furnishing an effectively constant zero point of reference.

The generator portion of this apparatus includes an electron tube 18 connected in a Hartley circuit, which latter has its period determined substantially by the constants of an inductance 19 and a capacity 20. Either the inductance or the capacity may conveniently be made variable in order to change the frequency employed in measurement, but it is preferred that the frequency product values of these elements be set by reference to some standard, such as a frequency meter and that they be so arranged that they will remain in permanent adjustment, at least during the period of time when a series of measurements are to be made. Stopping condenser 14' and feed resistance 15' connected to the anode of tube 18 function in a fashion similar to the correspondingly numbered elements connected to tube 13.

At 61 is indicated a transformer provided with a primary winding 62 suitable for connection to an alternating current power supply by means of cord 80 and plug 81 and with a tapped secondary winding 63 feeding the anodes of a full wave rectifying tube 30, whose filament is heated by current derived from another winding 64, the latter also being situated upon transformer 62. This transformer may conveniently be controlled by switch 82. The pulsating output of rectifier tube 30 is partly filtered by means of a network including resistances 31 and 32, and condenser 33. I have indicated at 65 the grounding of the mid-point of winding 63, but this is not essential and other points may be grounded in accordance with well known engineering practice. Similar latitude applies with respect to the grounds indicated at points 66, 67 and 68. The rectified and partly filtered energy derived from rectifier 30 and its associated filter circuits is used to supply the anode energy to all the electron tubes employed in this form of my invention.

The generator and the meter proper are utilized to give rise to a heterodyne beat note and the frequencies of the two parts are compared by bringing them into a single circuit. Coil 23, coupled to coil 1 will have induced therein a frequency equal to that existing in coil 1. Coil 24 is similarly coupled to coil 19 and will therefore carry a frequency identical with that present in coil 19. Coils 23 and 24 are connected together by the lead 70 and the common circuit thus constituted is connected through another lead 71 to the input of an amplifying electron tube 22.

A conventional input circuit comprising stopping condenser 26 and bias resistor 25 is employed between lead 71 and the grid of tube 22. This latter tube receives its anode energy through a series resistor 27 which is connected by lead 72 to the output of rectifier 30.

The amplified output of tube 22 is led through isolation condenser 29 to an indicating device 28 connected to terminals 74 and 75, which device may conveniently be a conventional pair of head telephones, although other suitable indicators such as a galvanometer may likewise be employed. The indicating device is shunted by a resistance 39, whose connection thereto is determined by means of a switch 40.

The general principles involved in the interaction of the two frequencies derived respectively from the generator and the meter proper and giving rise to a heterodyne or beat frequency, which latter in turn is detected and amplified by tube 22, are well known in the electrical measuring art and therefore are thought not to demand a detailed explanation. Detection takes place in the grid circuit of tube 22 through the action of resistor 25 and the condenser 26. The detection product appears across the resistor 27 and passes through condenser 29 to telephones 28. A resistance 39 in series with switch 40 is connected in shunt with telephones 28. When switch 40 is in closed position the intensity of the beat note is lowered and the unwanted harmonics are also reduced in intensity making it easier to pick out the beat note due to the fundamental frequency $f$.

With switch 40 open, the entire current is allowed to operate the telephones 28. This feature is very desirable, for a close adjustment of the beat note. Resistance 39 may be a fixed or variable resistor, or other means of volume control and switch 40 may be a push-button, switch or some other means of controlling the continuity of the circuit to the resistance 39.

One method of operating this device is as follows: Oscillators 18 and 13, rectifier 30 and amplifier 22 are set into operation by closing switch 82 and thus connecting winding 62 to a suitable power supply. The cathodes of these tubes may be heated from any convenient source (not shown) such as suitable auxiliary secondary windings upon transformer 61. Switch 36 is varied so that the desired ratio of transformation may be had through auto transformer 1. Leads are connected to binding posts 34 and 35 but the unknown capacity is omitted from the other ends of these leads. This serves to allow for any capacity inherent in the leads themselves. Condenser 2 is set at zero while switch 37 is in the open position. Condenser 60 is then altered until the frequencies of tube 18 and tube 13 are identical as shown by the zero beat delivered through amplifier 22 to telephones 28. Switch 40 may be used as previously indicated to aid in the preliminary adjustments leading up to this zero point.

The unknown capacity is now connected to the leads from posts 34 and 35 and condenser 2 altered until the zero point is restored.

The capacity change of condenser 2, multiplied by the ratio of transformation factor corresponding to the particular point upon which switch 36 is placed, will give the desired determination of value for the unknown capacity.

I have found that the determination of the zero point may be greatly facilitated by the use of what may be termed a hum modulation method. By modulating the energy fed the two oscillating tubes of Fig. 11 with a comparatively low frequency, when these two oscillators come close enough to each other in frequency to produce an audible beat note of very low frequency, this latter beat note will modulate the low frequency or hum already existing in the circuits of the meter.

I have found that by the use of this method a beat frequency of a fraction of a cycle was readily detected while a beat frequency of several cycles was necessary in order to be apparent in the telephone receivers, when no hum modulation was employed.

I have found that if the two oscillators are sufficiently close to one another in frequency, a true beat note may not exist, and without this hum modulation method, the exact location of the null point would be difficult. However with my method of hum modulation, a difference of character of the hum may be observed, even when no true beat exists. This may be due to phase differences between the oscillators, but in any case may serve as a convenient method of the closer determination of the precise zero point and thus facilitate the accuracy of determinations by means of my invention. When the two oscillators are thus adjusted they may conveniently be termed homofrequential.

One convenient method of securing the low or hum modulating frequency just described is by taking advantage of the fact that the output of rectifier 30 already contains a hum component of approximately twice the frequency of the alternating current supplied to transformer 61. According to usual practice, this hum would be substantially completely filtered out from the rectified current delivered by tube 30. I have found that by making the filter network 31, 32, 33 of smaller electrical size and/or of greater simplicity than is customary, I can secure the desired degree of hum modulation in the current delivered by this filter network.

When employing the apparatus of Fig. 11 and using the hum modulation method of detecting the zero point, it will be noticed that three different points will normally be found where an apparent zero beat is produced. The center one of these three points represents the true zero beat between the two high frequency oscillators, while the other points located respectively upon each side of this true point represent the condition where the difference frequency between the two oscillators equals the hum frequency. The middle or true zero point can readily be distinguished by the fact that the residual sound in the telephones is usually much less in this case than in the case of the two other apparent zero points. These apparent zero points may be used as an indication of a fixed relation between the two oscillators, if preferred, instead of using the true zero point.

In such a case, however, any change in the frequency supplied to transformer 61 may cause an error in the reading of the apparatus. Accordingly I prefer to use the true zero point as in that case the other points of apparent zero may serve as convenient indicators to allow a rapid determination of two separated points between which the true zero can then readily be located.

While not limited to the following values, the following constants were used on one device constructed according to Fig. 11: Frequency $f$ 25,000 cycles; coil 1, 1000 turns total; condensers 2, 10 and 20, 1000 micro-microfarads maximum each; coil 19, 1000 turns total; coils 23 and 24, 50 turns each; resistor 25, 1 megohm; condenser 26, 500 micro-microfarads; resistor 31, 3000 ohms; resistor 32, 10,000 ohms; resistor 27, 25,000 ohms; resistor 15, 50,000 ohms; condenser 33, 4 microfarads; and condenser 20, 1 microfarad.

It was found that with a single meter using the circuit of Fig. 11, capacities could be measured from one micro-microfarad to ten microfarads, a range of one hundred million to one. This same circuit with switch 37 closed also permitted measuring inductances from one microhenry to one hundred millihenries, a range of one hundred thousand to one. The upper limit of inductance measurements is set by the frequency $f$ of the oscillators 13 and 18. Lowering frequency $f$ by using more turns on coils 1 and 19, or by inserting iron cores in these coils would permit extension of the inductance range. For instance with $f$ equal to 1000 cycles the inductance upper limit would be raised to about one hundred henries.

Figure 12:
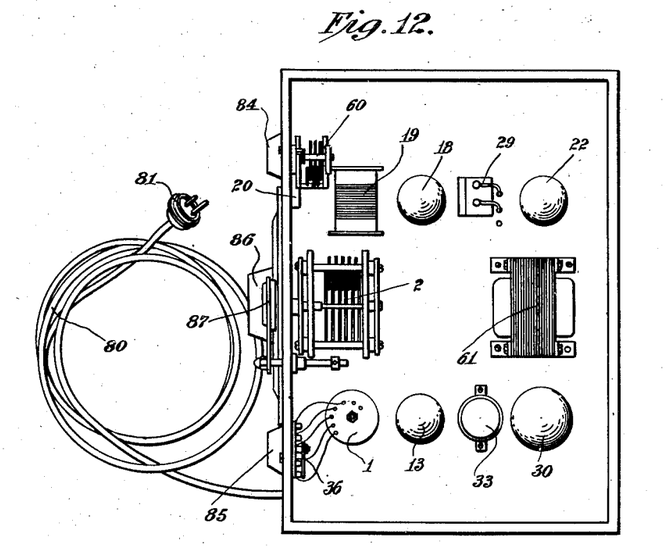
Fig. 12 is a plan view of a meter constructed to embody the circuits of Fig. 11.

Referring now to Fig. 12, there is shown a plan view of one form of meter constructed according to the circuit of Fig. 11. Certain less important parts are mounted beneath the supporting base and accordingly are not visible. The visible parts bear the same reference numerals as in Fig. 11. On the front of the control panel are seen a knob 84 controlling condenser 60, a knob 85 controlling switch 36 and knob 86 controlling condenser 2. At 87 is indicated an optical device used to facilitate the close reading of the dial attached to condenser 2 and controlled by knob 86.

Figure 13:
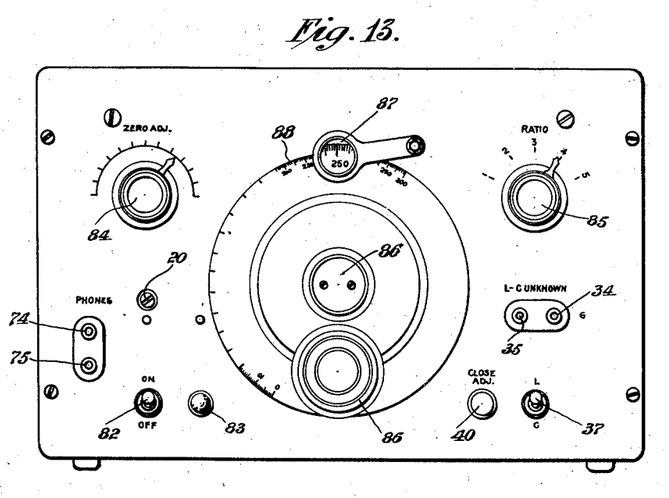
Fig. 13 is a front elevation of the control panel of the meter shown in Fig. 12.

In Fig. 13 is shown a front elevation of the control panel of the meter illustrated in Fig. 12. In this figure, 88 represents the calibrated dial which is attached to the shaft of condenser 2. There can also be seen the outer adjusting screw of condenser 20. This adjusting screw may conveniently be sunk into a recess below the surface, in order to prevent any accidental change of value of this condenser.

At 83 is shown the exterior portion of a pilot light which may conveniently be connected to any suitable current carrying portion of the apparatus, such as one of the sources of energy which are employed to heat the cathodes of the tubes. The use of such a pilot light is well known in the art and required no detailed description.

In Fig. 14 is illustrated a simple circuit somewhat similar to the circuits of Fig. 4 and Fig. 8, illustrating how a variable inductor may be used instead of a variable condenser, to maintain the frequency of the system constant.

A calibrated standard inductor $L_3$ is shunted across the oscillatory circuit comprised by inductance $L_1$ and fixed capacity $C_3$ in parallel. The unknown capacity $C_2$ is shunted across inductance $L_2$, which comprises a portion of $L_1$. Inductor $L_3$ may be varied to restore the frequency of the system after the connection of $C_2$, and from the variation required the value of $C_2$ may be determined in accordance with the theory previously herein described. A similar substitution of inductor for condenser may be made in the devices illustrated in the other figures.

One important fact to note is that the entire fundamental operation of my invention may take place in a reversed fashion. The forms of my invention shown in the drawings are suitable for measuring such capacities as may conveniently be read upon dial 88 of condenser 2. If it be desired to measure capacities smaller than can conveniently be measured when the unknown capacity is connected directly in shunt with condenser 2, the transformer action of my invention may conveniently be reversed.

As an illustration of such reversal of connection reference may be made to Fig. 7. If condenser 2 of this figure be considered as the unknown capacity and condenser 3 as the known standard of capacity, it is then evident by reason of the equations derived in the consideration of Figs. 1 and 2 that the value of the unknown condenser 2 will be so reflected by the transformer coil 1 as to appear similar to a relatively larger capacity connected across the points 4–6, where the standard capacity is now connected.

The value thus reflected will bear a definite ratio to the actual electrical value of the unknown capacity, in accordance with the principles demonstrated in connection with Figs. 1 and 2. This effective reversal of the functioning of circuits of my invention allows the range of measurement of the meter to be extended in such fashion as to permit the measurement of extremely low capacities even with the employment of a standard condenser of a customary and relatively large value of capacity.

It will be apparent that the fixed frequency oscillators illustrated in the drawings may have their frequency stabilized by any suitable means known in the art. Such stabilizing means may include a piezo electric crystal, a magneto-striction rod, electron coupling or other appropriate means. Such stabilizing means are of advantage in keeping the frequency employed in making a measurement constant. As previously pointed out, an ideally perfect transformer circuit would be independent of frequency changes, but since such an ideally perfect circuit cannot practically be constructed, I have found it preferable to employ constructions such as indicated in the drawings, and to avoid frequency changes by maintaining the frequency of the oscillators as fixed as possible.

Other variations and changes in the forms of my invention herein described will be apparent to those skilled in the art and I am not limited in respect thereto, other than by the scope of the claims appended hereto.

I claim:

1. A reactance meter including a transformer, capacitative means for tuning at least a portion of said transformer to a predetermined frequency, means for simultaneously connecting an unknown reactance across another portion of said transformer, so that said frequency is altered, and means for altering said capacitative means so that said frequency is restored to its first value and means for determining said frequency.

2. A reactance meter including a coil and condenser connected in parallel to the entire coil, means for determining the resonant frequency of said connected coil and condenser, means for connecting an unknown capacity in parallel with a portion only of said coil, while said condenser remains connected in parallel to said entire coil, so as to change the resonant frequency of said connected coil and condenser, and calibrated means for restoring the original resonant frequency thereof.

3. The method of measuring reactances which includes resonating a coil and condenser in parallel to said coil in its entirety at a given frequency, connecting an unknown reactance across a portion of said coil so as to alter the resonant frequency of the coil-condenser system while keeping said condenser in parallel to the entirety of said coil, altering said condenser so as to restore said resonant frequency to its original value, and measuring the extent of capacity alteration of said condenser.

4. A reactance meter including an inductance coil divided into sections, means for connecting an unknown reactance to any section thereof, a second inductance coil coupled to all sections of said first inductance coil, a calibrated variable capacity connected to said second inductance coil, and means for determining the resonant frequency of the system comprising said second inductance and said variable capacity.

5. An electrical meter having a wide range of measurement, comprising a calibrated condenser, a transformer having a ratio other than unity and having one winding thereof connected in shunt to said condenser, means for connecting an unknown reactance to another winding of said transformer and means for determining the resonant frequency of said meter.

6. A reactance meter including two inductance coils of unequal value, means for coupling said coils, a condenser of known value connected to one of said coils, means for connecting a reactance of unknown value to the other inductance and means for determining the resonant frequency of said meter.

7. A reactance measuring device including a condenser, means for varying the capacity of said condenser by a known amount, a coupling transformer having a plurality of windings, one of said windings being connected to said condenser and another of said windings being alternatively connected to or disconnected from the reactance to be measured, means for maintaining the circuit comprised by the first winding and the condenser in oscillation at substantially a fixed frequency and also including means for determining said frequency of oscillation.

8. A reactance meter including two coupled resonant circuits having unequal values of inductance, a known condenser connected to the first circuit, means for connecting an unknown condenser to the second circuit, means for maintaining said first circuit in oscillation, means for determining the frequency of oscillation of said circuit, and means for restoring said frequency of oscillation after the connection of said unknown condenser to said second circuit.

9. An electrical measuring device including a first circuit, means for causing said circuit to oscillate substantially at its resonant frequency, a second circuit, means for maintaining said second circuit in oscillation substantially at the same frequency, power means supplying hum modulated current to both said circuits, coupling means withdrawing oscillating energy from both of said circuits, beat note comparing means connected to said coupling means, means for connecting an unknown reactance to a portion of said first circuit so as to produce a beat note, and calibrated means for restoring the frequency of said first circuit, so that said beat note shall be substantially null.

10. The method of determining the beat note between a plurality of oscillators which includes supplying electrical energy in the form of hum modulated current to both of said oscillators, and allowing said hum to be modulated by the beat note so that the null point of said beat note can be precisely determined.

11. A reactance meter including a transformer, means for coupling said transformer to an alternating current power supply, means for switching said transformer, current rectifying means actuated by said transformer and delivering rectified current, filtering means receiving said rectified current and partly filtering it so as to leave a residual hum therein, two homofrequential oscillating circuits supplied with electrical current from said filter means, means for maintaining the frequency of one circuit constant, means for connecting an unknown reactance to a portion only of the second circuit, so as to alter the frequency thereof, a pick up circuit coupled to both said circuits, and receiving energy therefrom, amplifying means coupled to said pick up means, detecting means associated with said amplifying means, an output circuit connected to the output of said amplifying means and including an electrical responsive device capable of actuation by audio frequency currents, sensitivity reducing means connected to said responsive device, and capacitative means of known value for determining the restoration of the frequency of said second circuit to a value equal to that of said first circuit by producing a hum modulated zero beat note in said responsive device.

12. A reactance measuring device including a first inductance, a known capacity in shunt with said inductance, a second inductance, means for connecting an unknown reactance in shunt therewith, means for transferring energy in either direction between said two inductances and means for determining the resonant frequency of the system.

13. An electrical circuit for reactance measurements including a coil and a known capacity connected to form a resonant circuit, a second coil and means for connecting an unknown reactance thereto to form another resonant circuit, means for electrically coupling said two resonant circuits thus produced and means for determining the resonant frequency of the system.

14. A reactance measuring device including a first inductance, a known reactance in shunt with said inductance, a second inductance, means for connecting an unknown reactance in shunt therewith, means for transferring energy in either direction between said two inductances and means for determining the resonant frequency of the system.

15. An electrical circuit for reactance measurements including a coil and a known capacity connected to form a resonant circuit, means for varying the resonant period of said circuit connected thereto, a second coil and means for connecting an unknown reactance thereto to form another resonant circuit, means for electrically coupling said two resonant circuits thus produced and means for determining the resonant frequency of the system.

ALFRED W. BARBER.